A. G. LEGGE.
CEMENT CAN.
APPLICATION FILED FEB. 9, 1915.

1,215,667.

Patented Feb. 13, 1917.

Witnesses:
Helen M. Purcell
John H. Parker

Inventor:
Alfred G. Legge
by
Macleod, Cahn, Copeland & Dike
Attys.

UNITED STATES PATENT OFFICE.

ALFRED G. LEGGE, OF BROCKTON, MASSACHUSETTS.

CEMENT-CAN.

1,215,667. Specification of Letters Patent. Patented Feb. 13, 1917.

Application filed February 9, 1915. Serial No. 7,180.

*To all whom it may concern:*

Be it known that I, ALFRED G. LEGGE, a citizen of the United States, residing at Brockton, county of Plymouth, State of Massachusetts, have invented a certain new and useful Improvement in Cement-Cans, of which the following is a specification, reference being had therein to the accompanying drawings.

In the manufacture of various articles such as boots and shoes requiring the use of a cement in which an inflammable solvent is employed, it is important to have a closed container or cement can to prevent the evaporation of the cement and the escape of inflammable fumes, while at the same time permitting the cement to be readily accessible to the user. It is also desirable to limit the quantity of cement which can be removed from the can at any one time, thus preventing waste, and also so that a large quantity of cement shall not be exposed to the atmosphere at any one time.

My invention has for its object to provide a cement can fulfilling these requirements. In the can embodying my invention the cement is contained in the interior of the can, and the can is closed by an air tight cover. The cement may be removed without opening the can to the atmosphere. There is no evaporation from the interior of the can because the can is open to the atmosphere only when it is being filled and this can be done outside the building when it is used. The cement is therefore maintained in a fresh liquid condition much reducing the waste. It is removed from the can in predetermined quantities easily and conveniently, and only a small quantity is exposed to the atmosphere at any one time. Should the cement which is exposed catch fire, the flame will not be communicated to the cement in the cement can.

The invention will be fully understood by reference to the following description, taken in connection with the accompanying drawings, and the novel features are pointed out and clearly defined in the claims at the close of this specification.

In the drawings—

Referring to the drawings—

Figures 1, 2, 3:
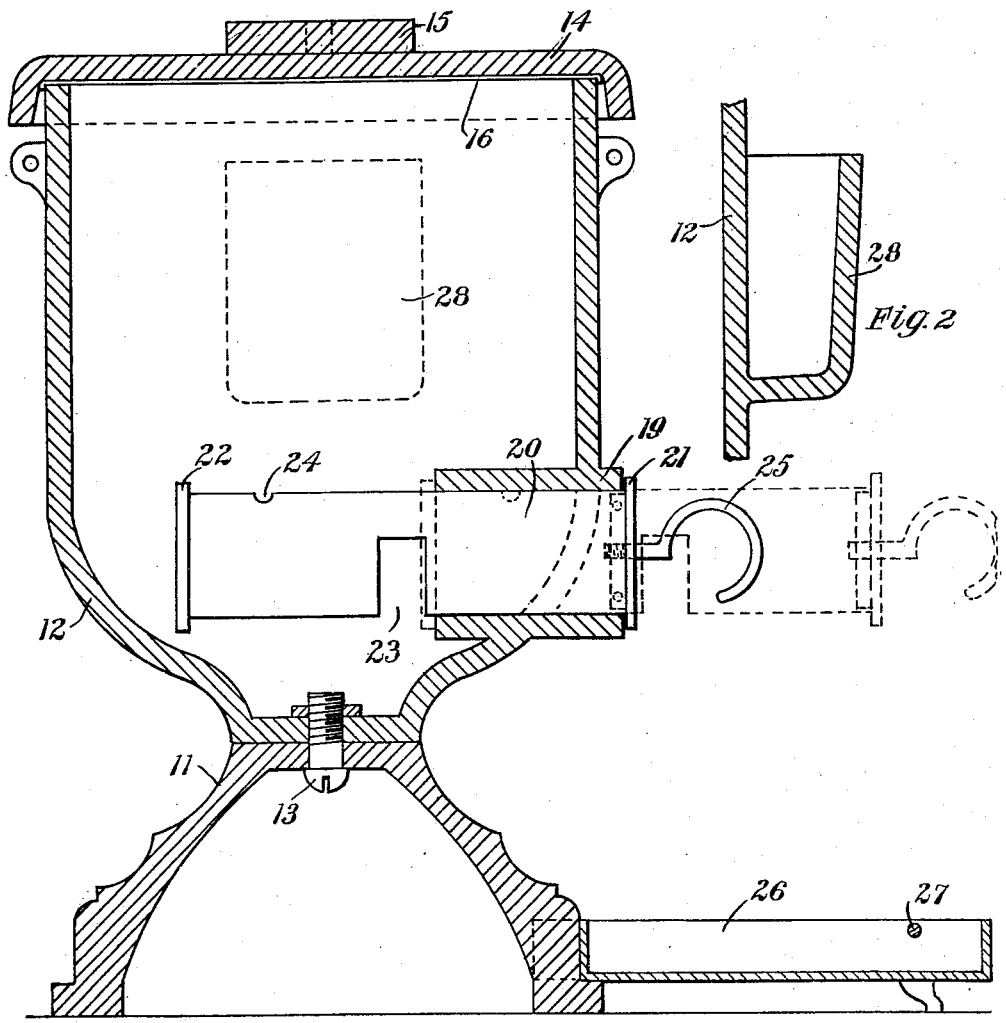
Figure 1 is a vertical section of a can embodying my invention.
Fig. 2 is a vertical section of a portion of the can, said section being at right angles to Fig. 1.
Fig. 3 is a detail showing the manner of securing the cover.

At 11 is shown the base, and at 12 the container, the two parts being secured together conveniently by a bolt 13 and being made preferably of cast iron. At 14 is shown the cover provided with the handle 15, and making an air tight joint with the body of the can by means of an asbestos gasket 16. The cover 14 is conveniently forced down upon the rim of the container to make said air tight connection by means of a pin and slot connection, see Fig. 3. The pin 17 is secured to the body of the can and a slot 18 is formed in the rim of the cover. The walls of the slot have a gradual slope so that by rotating the cover of the can the pin rides up on the edge of the slot and the cover is forced downwardly thereby compressing the asbestos gasket. The cover is provided with a plurality of these pins and slot connections, only one being shown in the drawings.

At 19 is shown a tubular boss extending both inwardly and outwardly from the side wall of the container at a point near the bottom. Within the boss 19 is located a slidable tubular dispensing member 20 having closed ends 21 and 22 of greater diameter than the bore of the tubular boss 19 so that the motion is limited thereby. On the lower side of the dispensing tube 20 and midway between its ends is a delivery slot or port 23, which preferably extends about the surface of the dispensing tube for a distance in excess of 180°. At 24 is shown an air vent formed in the top of the dispensing tube. The dispensing tube is of a length such that when it is pushed into the extreme limit of movement permitted by the end 21, the delivery port 23 will be clear of the inner end of the boss, and likewise when the dispensing tube 21 is pulled out and the end member 22 rests against the inner end of the boss, the delivery port 23 will be clear of the outer end of the boss. In other words, the length of the dispensing tube is in excess of twice the length of the boss plus the width of the delivery port 23. The vent 24 is placed in such a position that it is open to the interior of the container when the dispensing tube is pushed in to the extreme limit of its motion.

The dispensing tube is provided with a handle 25 conveniently of the shape shown in the drawings, which is such that the user will ordinarily keep it in vertical position, thereby maintaining the delivery slot in proper position.

Beneath the delivery slot when the dispensing tube is pulled out is placed a pan 26, into which the cement from the dispensing tube falls. This pan is shallow and of a convenient shape to contain a small portion of cement in which the workman's brush is dipped. At 27, is shown a bar just above the surface of the cement on which the workman can wipe the brush instead of on the side of the pan, thereby preventing the pan becoming gummed up.

At 28, (see Figs. 1 and 2,) is shown a pocket formed on the side of the container which serves as a brush holder for the brush when not in use.

In the use of my invention the cover is removed and the can filled with cement, after which the cover is secured tightly in place as described. The cement is thus inclosed in an air tight chamber and cannot evaporate, neither can the fumes escape to the atmosphere. The danger of fire is therefore very much reduced. The cement flows into the dispensing tube and fills it, the air in the dispensing tube escaping through the vent 24 and passing through the main body of the cement to the top of the container. When the workman requires to use cement, he pulls out the dispensing tube 20 for the extreme distance permitted by the end member 22 and the cement flows out of the delivery port and falls into the pan 26. The capacity of the dispensing tube is proportioned to the size of the pan so that the pan is filled to the proper level. The dispensing tube is then pushed back into the can and the cement within the can fills the dispensing tube, the air escaping as before through the vent 24. It will be seen that at no time during this operation is the interior of the can open to the air and therefore the fumes contained within the can are not permitted to escape. It will also be seen that there is no possibility of leakage and it makes no difference whether the dispensing tube is left pulled out or is pushed back into the body of the cement can, the opening being closed at all times. It will also be seen that each time the dispensing tube is pulled out and pushed in again, an amount of air is introduced into the interior of the cement can sufficient to compensate for the volume of cement which is removed, so that no vacuum is formed in the can.

As previously stated, I prefer to form the body of my cement can of cast iron, because by so doing the danger resulting from the use of the cement is considerably lessened. If, as is likely to occur, the solvent from the portion of the cement in the pan should catch fire no considerable damage is likely to be done because of the small amount of the cement contained therein, and also because the cement can, being of cast iron, the heat is not transmitted to the mass of cement in the interior of the can sufficiently to produce a dangerous condition, neither are there any soldered joints to melt, thus allowing the cement to escape or the flame to reach the interior of the container. I have found by actual experiments that the cement in the pan may be ignited and allowed to burn without the contents of the can catching fire. My improved cement can makes it unnecessary to have the cans gathered up at night and removed from the factory as is now required by the regulations of the fire underwriters.

What I claim is:

1. In combination, an air tight container having a tubular boss, one end of which extends into the interior of the chamber, and the other end of which extends beyond the wall of the said container, a dispensing tube closed at its ends and slidably mounted in said boss and having a delivery port midway of its length, said delivery tube having a length at least equal to twice the length of the boss plus the width of the delivery port.

2. In combination, an air tight container having a tubular boss, one end of which extends into the interior of the chamber, and the other end of which extends beyond the wall of the said container, a dispensing tube closed at its ends and slidably mounted in said boss and having a delivery port midway of its length, said delivery tube having a length at least equal to twice the length of the boss plus the width of the delivery port, and having an air vent on the inner end of said delivery tube.

In testimony whereof I affix my signature, in presence of two witnesses.

ALFRED G. LEGGE.

Witnesses:
GEORGE P. DIKE,
ALICE H. MORRISON.

Copies of this patent may be obtained for five cents each, by addressing the "Commissioner of Patents, Washington, D. C."